(12) United States Patent
Dammers et al.

(10) Patent No.: US 11,299,314 B2
(45) Date of Patent: Apr. 12, 2022

(54) PACKAGE SLEEVE, PACKAGE AND METHOD FOR MANUFACTURING A PACKAGE

(71) Applicant: SIG Technology AG, Neuhausen am Rheinfall (CH)

(72) Inventors: Matthias Dammers, Alsdorf (DE); Birgit Birninger, Linnich (DE); Christoph Mehler, Moenchengladbach (DE); Thomas Vetten, Duesseldorf (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 16/087,825

(22) PCT Filed: Mar. 16, 2017

(86) PCT No.: PCT/EP2017/056198
§ 371 (c)(1),
(2) Date: Sep. 24, 2018

(87) PCT Pub. No.: WO2017/174317
PCT Pub. Date: Oct. 12, 2017

(65) Prior Publication Data
US 2019/0106239 A1    Apr. 11, 2019

(30) Foreign Application Priority Data
Apr. 4, 2016  (DE) .................... 10 2016 003 826.8

(51) Int. Cl.
*B65D 5/06* (2006.01)
*B65D 5/02* (2006.01)
(Continued)

(52) U.S. Cl.
CPC ............. *B65D 5/064* (2013.01); *B65D 5/029* (2013.01); *B65D 5/4266* (2013.01);
(Continued)

(58) Field of Classification Search
CPC ...... B65D 5/064; B65D 5/029; B65D 5/4266; B65D 5/067
(Continued)

(56) References Cited

U.S. PATENT DOCUMENTS 2,050,894 A * 8/1936 Eaton ..................... B65D 5/029
229/116.1
3,610,514 A * 10/1971 Samsing ................ B65D 5/029
229/108
(Continued)

FOREIGN PATENT DOCUMENTS

CN    1217695 A    5/1999
CN    1646378 A    7/2005
(Continued)

*Primary Examiner* — Christopher R Demeree
(74) *Attorney, Agent, or Firm* — The Webb Law Firm

(57) ABSTRACT

Provided is a package sleeve made of a composite material for the manufacture of a package, including: a front surface, a rear surface, two side surfaces, base surfaces and gable surfaces which are arranged on opposite sides of the two side surfaces, the front surface and the rear surface, and a longitudinal seam which connects two edges of the composite material to form a package sleeve. The package sleeve has several fold lines. The two side surfaces have a secondary fold line running therethrough. The package sleeve is folded along both secondary fold lines. The package sleeve is open both in the region of the base surfaces and in the region of the gable surfaces. Also provided are a package and a method for manufacturing a package.

25 Claims, 9 Drawing Sheets

(51) Int. Cl.
*B65D 5/42* (2006.01)
*B65D 5/74* (2006.01)

(52) U.S. Cl.
CPC ....... *B32B 2439/62* (2013.01); *B32B 2439/70* (2013.01); *B65D 5/746* (2013.01)

(58) Field of Classification Search
USPC .......... 229/184, 930, 213, 214, 249, 125.04, 229/198.2; 220/677
See application file for complete search history.

(56) References Cited

U.S. PATENT DOCUMENTS

| | | | |
|---|---|---|---|
| 3,866,523 | A | 2/1975 | Geschwender |
| 4,559,259 | A | 12/1985 | Cetrelli |
| 4,586,650 | A * | 5/1986 | Sasaki ................ B65D 5/064 229/137 |
| 5,704,886 | A | 1/1998 | Sampaolo et al. |
| 5,738,272 | A | 4/1998 | Anchor et al. |
| 5,848,749 | A * | 12/1998 | Ljungstrom ........... B65D 5/067 229/137 |
| 5,871,144 | A * | 2/1999 | Anchor .................. B65D 5/067 229/104 |
| 6,042,527 | A | 3/2000 | Anderson et al. |
| D578,389 | S * | 10/2008 | Kalberer ........................ D9/432 |
| D589,791 | S * | 4/2009 | Kalberer ........................ D9/432 |
| 7,523,853 | B2 * | 4/2009 | Kortsmit ............... B65D 5/067 229/108 |
| D596,027 | S * | 7/2009 | Kalberer ........................ D9/432 |
| D601,016 | S * | 9/2009 | Kalberer ........................ D9/432 |
| 7,934,637 | B2 * | 5/2011 | Kaneko .................. B65D 5/064 222/81 |
| 8,528,807 | B2 | 9/2013 | Kaneko |
| D728,364 | S * | 5/2015 | Baker ............................ D9/432 |
| D803,044 | S * | 11/2017 | Franic .......................... D9/431 |
| D803,682 | S * | 11/2017 | Jacobsson ...................... D9/433 |
| 2008/0290146 | A1 * | 11/2008 | Daley .................... B65D 5/061 229/109 |
| 2011/0113733 | A1 | 5/2011 | Franic |
| 2011/0230321 | A1 | 9/2011 | Alef et al. |
| 2012/0279182 | A1 | 11/2012 | Barbieri et al. |
| 2013/0299565 | A1 | 11/2013 | Okezawa |
| 2016/0376045 | A1 | 12/2016 | Seiche |
| 2017/0174387 | A1 | 6/2017 | Johansson et al. |
| 2019/0337666 | A1 | 11/2019 | Dammers et al. |

FOREIGN PATENT DOCUMENTS

| | | |
|---|---|---|
| CN | 101875420 A | 11/2010 |
| CN | 103209833 A | 7/2013 |
| CN | 103228544 A | 7/2013 |
| CN | 207045926 U | 2/2018 |
| DE | 2425564 | 12/1974 |
| DE | 4237859 A1 | 5/1994 |
| DE | 19945500 A1 | 4/2000 |
| DE | 202004010230 U1 | 9/2004 |
| DE | 202004010230 U1 | 11/2004 |
| DE | 102009024318 A1 | 6/2010 |
| EP | 0027350 A1 | 4/1981 |
| EP | 0027668 A1 | 4/1981 |
| EP | 0176278 A2 | 4/1986 |
| EP | 0277517 A1 | 8/1988 |
| EP | 0277673 B1 | 8/1988 |
| EP | 0503314 A1 | 9/1992 |
| EP | 1080880 A1 | 3/2001 |
| EP | 0936150 B1 | 4/2004 |
| EP | 2392517 A1 | 12/2011 |
| EP | 2650222 A1 | 10/2013 |
| FR | 2928358 A1 | 9/2009 |
| GB | 808223 A | 1/1959 |
| JP | 489626 | 3/1973 |
| JP | S6169544 A | 4/1986 |
| JP | 1191727 A | 4/1999 |
| JP | 2001130543 | 5/2001 |
| JP | 2001213427 A | 8/2001 |
| JP | 200267192 A | 3/2002 |
| JP | 2004224411 A | 8/2004 |
| JP | 201018283 A | 1/2010 |
| WO | 9732787 A2 | 9/1997 |
| WO | 03089317 A1 | 10/2003 |
| WO | 2009101029 A1 | 8/2009 |
| WO | 2009141389 A2 | 11/2009 |
| WO | 2015003852 A9 | 1/2015 |
| WO | 2015193354 A1 | 12/2015 |

* cited by examiner

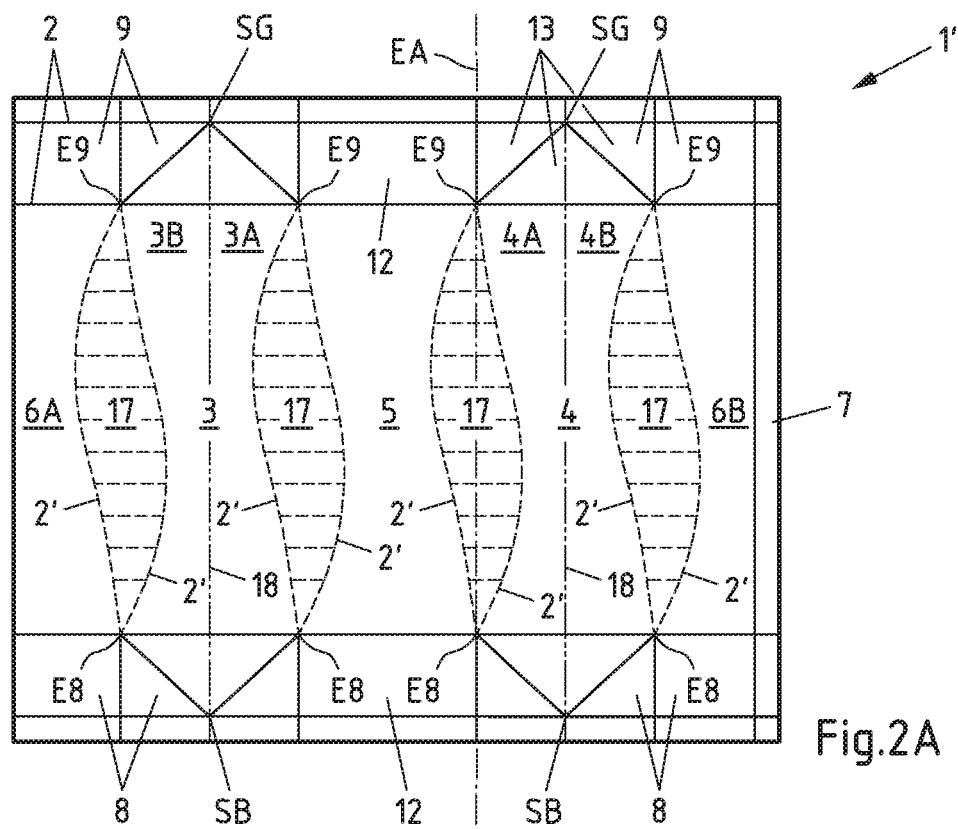
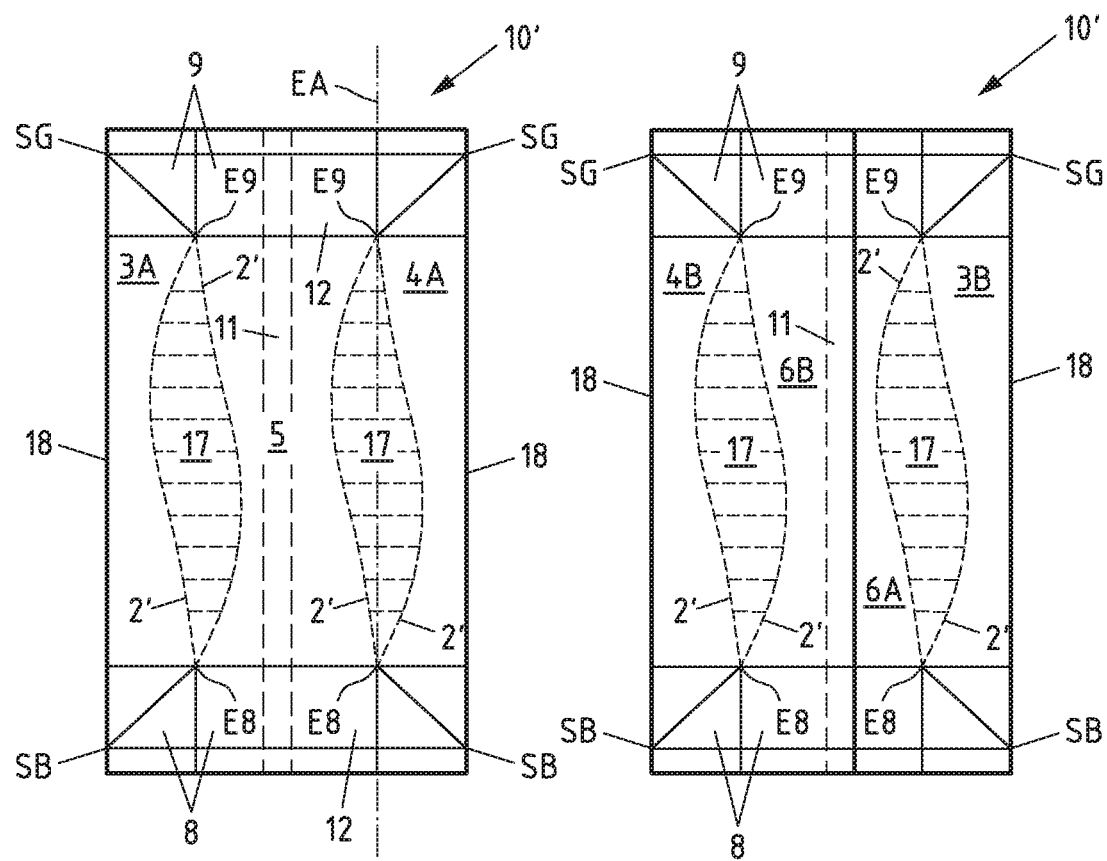
Fig.2A
Fig.2B    Fig.2C

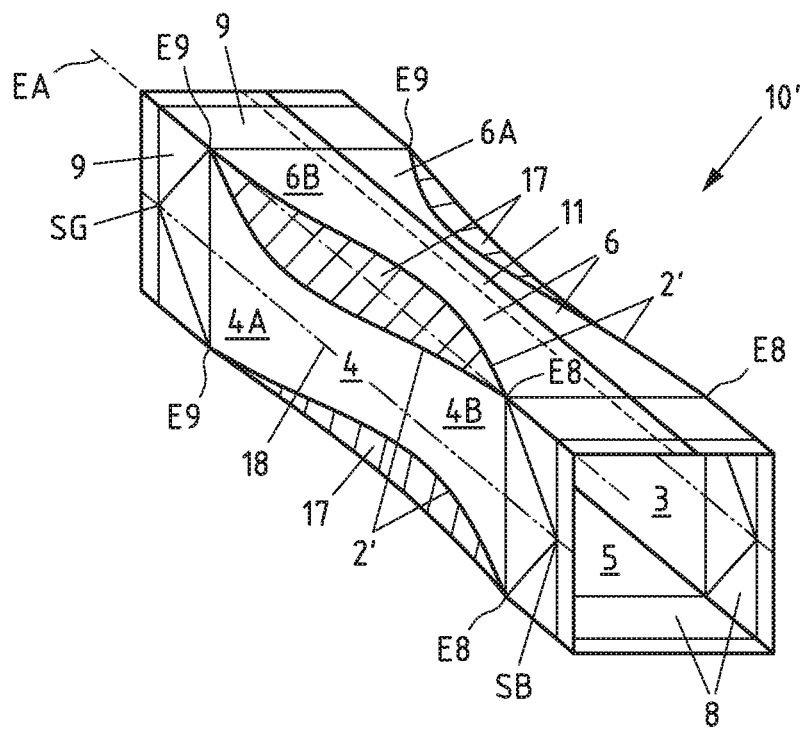
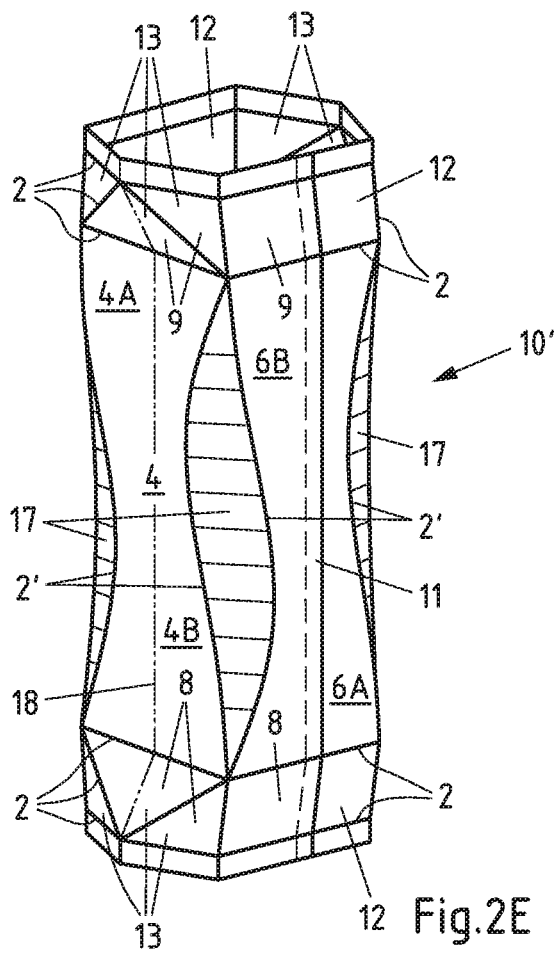 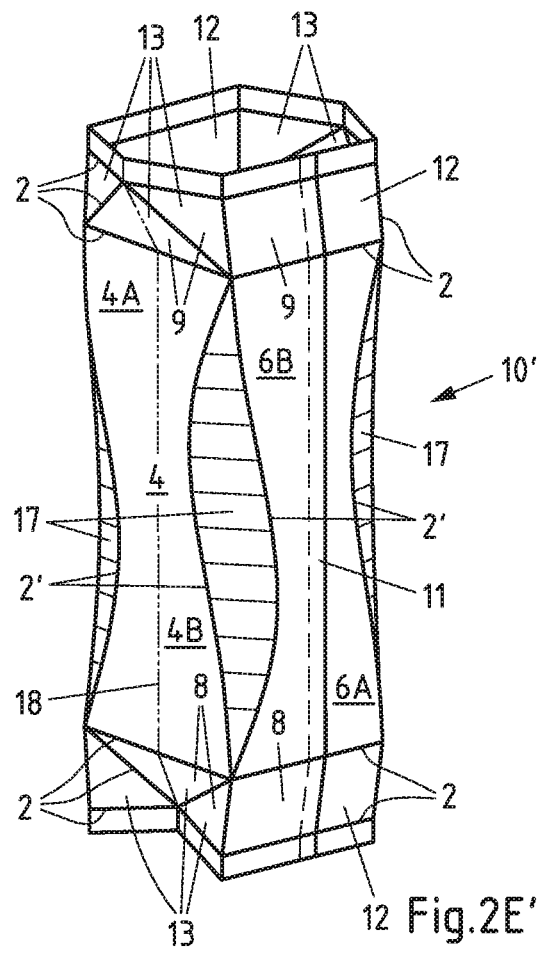

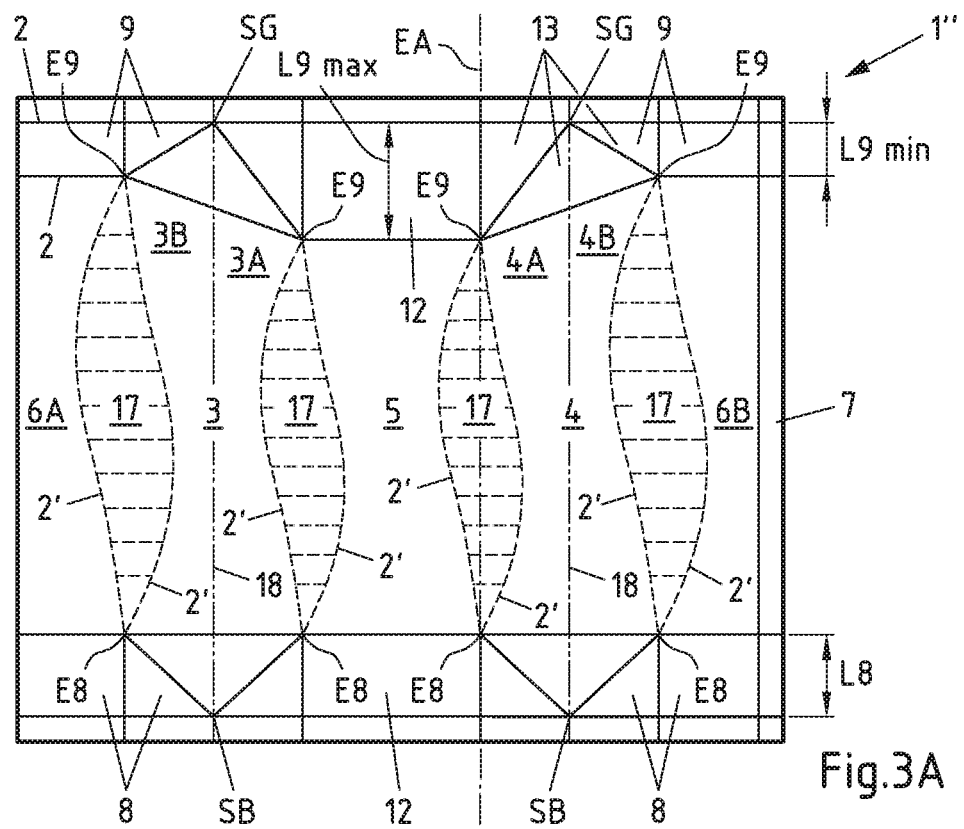
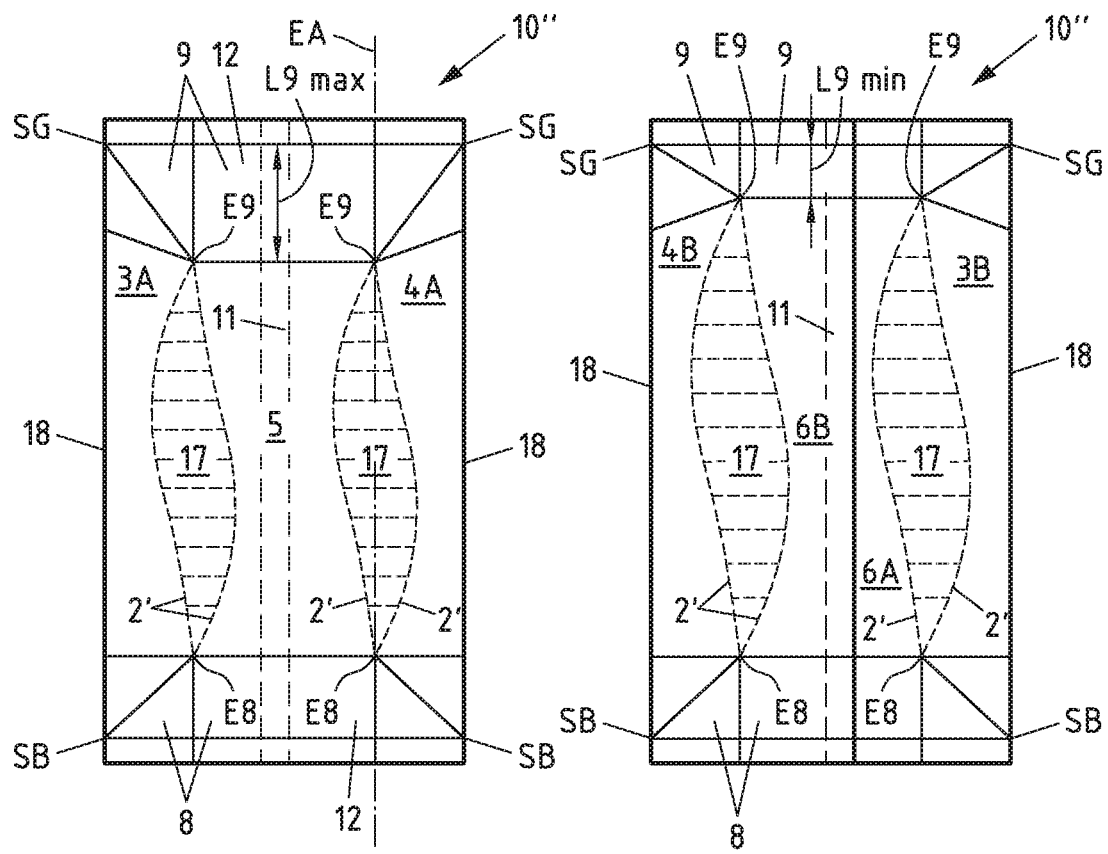

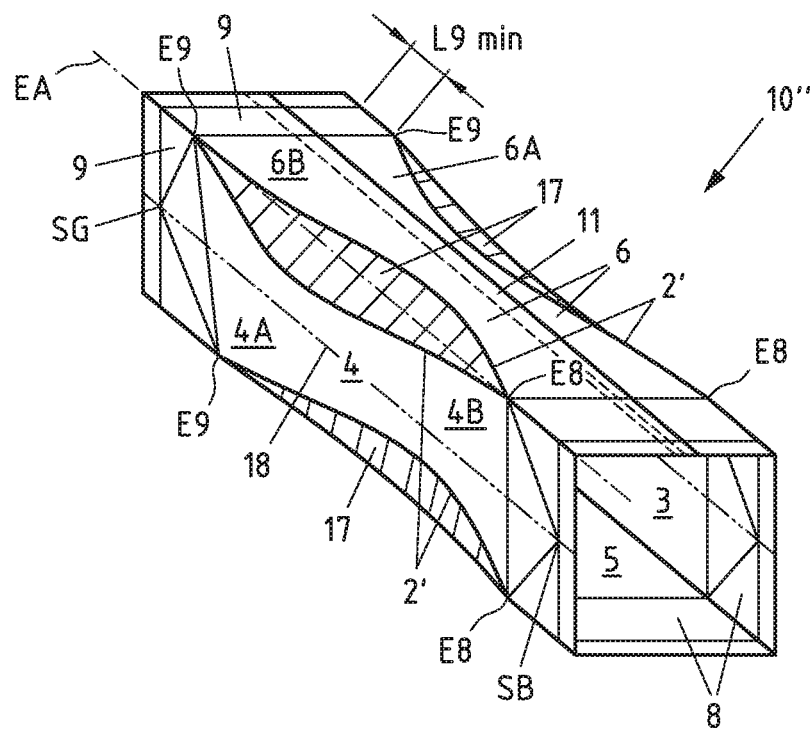
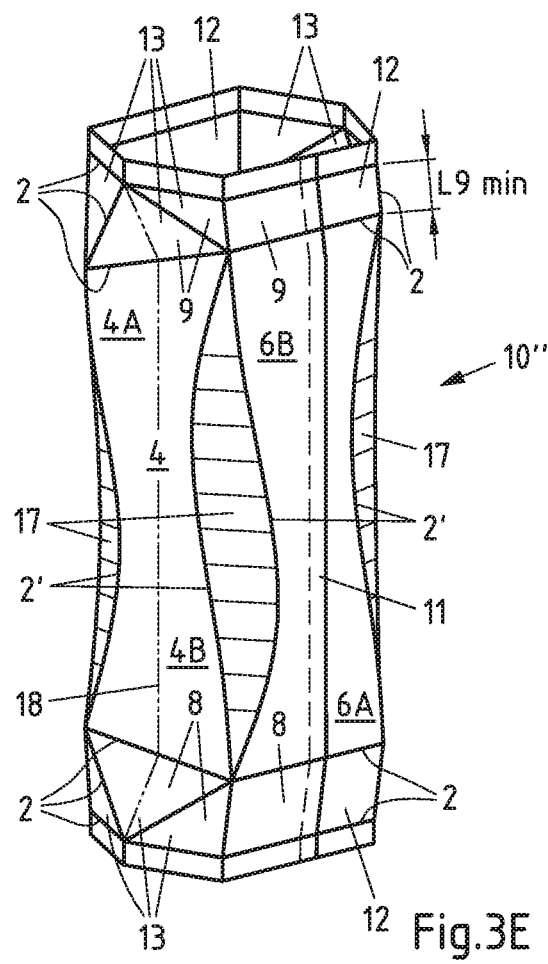 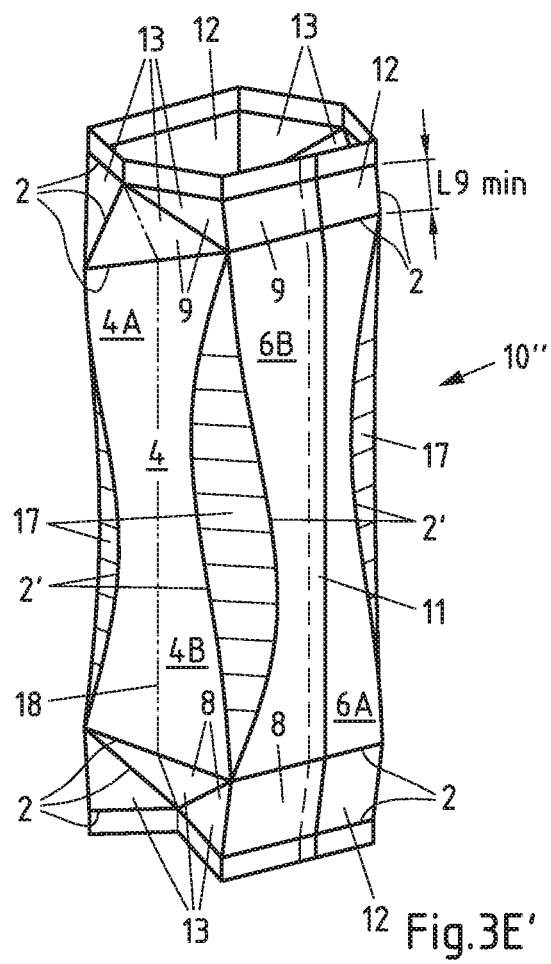
Fig.3D
Fig.3E    Fig.3E'

PACKAGE SLEEVE, PACKAGE AND METHOD FOR MANUFACTURING A PACKAGE

CROSS-REFERENCE TO RELATED APPLICATIONS

This application is the United States national phase of International Application No. PCT/EP2017/056198 filed Mar. 16, 2017, and claims priority to German Patent Application No. 10 2016 003 826.8 filed Apr. 4, 2016, the disclosures of which are hereby incorporated in their entirety by reference.

BACKGROUND OF THE INVENTION

Field of Invention

The invention relates to a package sleeve made of a composite material for the manufacture of a package, comprising: a front surface, a rear surface, two side surfaces, base surfaces and gable surfaces which are arranged on opposite sides of the two side surfaces, the front surface and the rear surface, and a longitudinal seam which connects two edges of the composite material to form a circumferential package sleeve, wherein the package sleeve has several fold lines, wherein the two side surfaces in each case have a secondary fold line running through the side surface, and wherein the package sleeve is exclusively folded along both secondary fold lines.

The invention further relates to a package made of a composite material, wherein the package is folded along the fold lines, wherein the package is sealed in the region of the base surface and in the region of the gable surface, and wherein the partial areas of both side surfaces adjacent to the secondary fold lines are in each case arranged relative to one another in an angular range between 160° and 200°, in particular between 170° and 190°.

Finally, the invention relates to a method for manufacturing a package from a package sleeve made of a composite material.

Description of Related Art

Packages can be manufactured in different ways and from an extremely wide range of materials. A widely used possibility for their manufacture consists of producing a sleeve blank from the package material from which, through folding and further steps, first a package sleeve and finally a package is produced. This manufacturing method has the advantage, among others, that the sleeve blanks and package sleeves are very flat and can thus be stacked, saving space. In this way, the sleeve blanks or package sleeves can be manufactured in a different location to that where the folding and filling of the package sleeves takes place. Composite materials are frequently used as material, for example a composite material consisting of several thin layers of paper, paperboard, plastic or metal, in particular aluminium. Such packages are widely used in the foodstuffs industry in particular.

A first manufacturing step frequently involves producing a circumferential package sleeve from a sleeve blank through folding and welding or adhesive bonding of a seam. The folding of the sleeve blank usually takes place along pre-stamped fold lines. The location of the fold lines thereby corresponds to the location of the edges of the package which is to be produced from the package sleeve. This has the advantage that the sleeve blank and the package sleeve are exclusively folded at points at which the finished package is folded in any case. In the context of the present application, a sleeve blank refers to a sheet, manufactured from a composite material product produced on a roll, cut to size in a longitudinal and transverse direction and with a defined outline ("planar composite"). A package sleeve is subsequently manufactured from the sheet or planar composite and finished ready for sale, wherein a package sleeve is regarded as being ready for sale if, possibly following removal from an outer packaging provided for transport from the place of manufacture to the place of use, it is ready for processing in a filling machine intended for this purpose. This means in particular that the package sleeve requires no further mechanical interventions in order to guarantee smooth processing of the package sleeve on the filling machine intended for this purpose. In contrast, conditioning to the outer atmosphere and/or (additional) sterilisation (for example the applicant's edge sterilisation method) can also be carried out, optionally, on a finished package sleeve during or following transport to the intended place of use. On the other hand, intermediate steps occurring during the manufacture of the package sleeve from a sleeve blank involving forming and sealing cannot yet be described as relating to a package sleeve. A method for manufacturing a package from a package sleeve is for example known from WO 2015/003852 A9 (in particular, FIG. 1A to FIG. 1E). The package described therein has a rectangular cross-sectional profile and is generally cuboid in form.

As well as packages with rectangular cross-sectional profiles, packages are also known with cross-sectional profiles which have more than four corners. For example, packages with octagonal cross-sectional profile are known from EP 0 936 150 B1 or U.S. Pat. No. 6,042,527. The form of the packages is achieved in that additional fold lines are provided in the sleeve blanks.

However, one disadvantage of folding the described package sleeves along the later package edges is that only packages with tangular cross-sectional profiles can be manufactured. Moreover, only packages with a cross-sectional profile which remains identical in the vertical direction of the package can be manufactured. In contrast, alternative designs, for example rounded edges or free forms instead of the edges, are not possible.

Package sleeves ("sleeves") and packages manufactured from these ("containers") are also known from EP 0 027 350 A1. The package sleeve described therein allows packages to be manufactured the cross-sectional profile of which changes in a vertical direction (rectangular cross-sectional profiles on the gable and at the base, octagonal cross-sectional profile in between). However, this package too has exclusively angular cross-sectional profiles. Alternative designs, for example rounded edges or free forms instead of the edges, are also not described in EP 0 027 350 A1. Moreover, the package sleeve described therein does not consist of composite material, but of paperboard or corrugated board. In order to fill the container with liquid, an inner pouch made of plastic is suggested, so that the package sleeve itself need not itself be suitable for manufacturing a liquid-tight package.

Package sleeves and packages manufactured from these are also described in GB 808,223 A. Here, a long material web of paperboard is first provided with fold lines and then covered with a plastic layer (FIG. 6). After creating a longitudinal seam (FIG. 7), the material web is opened up to form a tube with a rectangular cross section (FIG. 8). The two side surfaces of the tube are then folded inwards, as a result of which the tube assumes a flat form (FIG. 9). Transversely oriented seams are created at specific intervals, along which the tube can be folded and a stack thus formed (FIG. 10). By separating the tube in the region of the transversely oriented seams, individual package sleeves are obtained which are already sealed at one end—through the transversely oriented seam. One disadvantage of this approach is that the package sleeves are already folded along six fold lines on being separated from the tube, four of these fold lines forming the edges of the later package. These package sleeves too are therefore only suitable for manufacturing packages with rectangular cross-sectional profiles. Moreover, the freedom of design of the gable or base surface created in the region of the already sealed transverse seam are severely limited. Particularly disadvantageous are the high forming forces which are necessary in order to open up and form the package sleeve into a package open at one end (this intermediate state is also described as a "beaker"). The high forming forces lead to a considerable load on the already-sealed seams, so that a liquid- and/or gas-tightness is no longer provided with adequate certainty.

A further package sleeve and a package manufactured from this are described in WO 97/32787 A2. However, in this package sleeve too, numerous fold lines are provided in the region of the sleeve surface, some of which form the later edges of the package produced from this. These package sleeves too are therefore only suitable for the manufacture of packages with angular cross-sectional profiles. A further disadvantage is that the package sleeve is not only sealed in the region of the rear side through a longitudinal seam, but is also already sealed in the region of the base through a transverse seam. This leads to a limited freedom of design of the base. Here too, the high forming forces which are necessary in order to open up and form the package sleeve into a package open at one end are particularly disadvantageous. The high forming forces lead to a considerable load on the already-sealed seams, so that a liquid- and/or gas-tightness is no longer provided with adequate certainty. Also disadvantageous is the limitation that only one base variant (lugs folded beneath the base) is possible, whereas a different base variant (lugs directed inwards above the base) is not possible.

SUMMARY OF THE INVENTION

Against this background, the invention is based on the problem of developing the package sleeve described and explained in detail above in such a way that the manufacture of packages—in particular liquid-tight packages—with complex geometry is made possible.

This problem is solved, in a package sleeve according to the preamble of claim 1, in that the package sleeve is open both in the region of the base surfaces and also in the region of the gable surfaces.

The package sleeve according to the invention consists of a composite material and is used to manufacture a package. In particular, the package sleeve can consist of a composite of several thin layers of paper, paperboard, plastic or metal, in particular aluminium. Preferably, the package sleeve is formed as a single part. The package sleeve comprises a front surface, a rear surface, two side surfaces as well as base surfaces and gable surfaces which are arranged on opposite sides of the two side surfaces, the front surface and the rear surface. Preferably, the gable surfaces are—in a standing package—arranged above the two side surfaces, the front surface and the rear surface and the base surfaces are arranged beneath the two side surfaces, the front surface and the rear surface. The designation of the surfaces is oriented on the surfaces of the package which is to be manufactured from the package sleeve. The package sleeve also comprises a longitudinal seam which joins two edges of the composite material to form a circumferential package sleeve. The longitudinal seam allows a continuous package sleeve, closed in a circumferential direction, to be manufactured from a flat—in most cases rectangular—blank. The longitudinal seam can for example be produced through adhesive bonding and/or welding. Because of the longitudinal seam, such package sleeves are also referred to as longitudinally sealed package sleeves. The package sleeve also has several fold lines. Fold lines are intended to facilitate the folding of the package sleeve and divide the package sleeve into several surfaces. Fold lines can be created through material weakenings. Since the packages are supposed to be liquid-tight, the material weakenings used are not perforations but so-called "creases". Creases are linear material displacements which are impressed into the composite material by means of pressing tools.

The two side surfaces are each provided with a secondary fold line running through the side surface, and the package sleeve is exclusively folded along both secondary fold lines. This design is based on the idea of not folding the package sleeve along fold lines which form the edges of the package produced from the package sleeve. That is to say the package sleeve is not folded along the fold lines which divide the front surface, the rear surface and the two side surfaces from one another. Instead, the package sleeve is exclusively folded along additionally-provided fold lines ("secondary fold lines") which do not later form an edge of the package, but are arranged between the edges of the package (in this case: in the side surfaces). A folding along the secondary fold lines therefore only takes place in the case of the package sleeve, but not in the case of the package produced from this. This permits a free design of the package geometry and in particular allows the manufacture of packages with package cross sections in a vertical direction which, at least in sections, are non-tangular.

According to the invention, the package sleeve is open both in the region of the base surfaces as well in the region of the gable surfaces. In other words, the package sleeve has two openings, one opening being arranged in the region of the base surface and the other opening being arranged in the region of the gable surface. The two opposite openings make it possible for the package sleeve to be opened out particularly simply, creating the form of a tube or sleeve. One advantage of package sleeves which are open at both ends—in contrast to WO 97/32787 A2 for example—lies in the variable design possibilities for the base. In particular, the orientation of the "lugs" can be chosen freely. A base variant can for example provide for the lugs to be folded under the rectangular surfaces of the base and fixed in place there. Another base variant can, in contrast, have inward-pointing lugs which are arranged above the rectangular surfaces of the base which are folded in later. A further advantage of package sleeves which are open at both ends is that their inner surfaces can be sterilised more easily, since a sterilising medium, for example a $H_2O_2$-containing gaseous mixture, can be readily transported, in a preferably laminar flow, through the package sleeves which are open at both ends in order to reduce germs.

According to one embodiment of the package sleeve, at least one of the fold lines does not run in a straight line, at least in sections, and is in particular curved or kinked. This design can in particular relate to those fold lines which connect the base surfaces with the gable surfaces, i.e. which run through the front surface, the rear surface or the side surfaces of the package sleeve. It can be the case that at least one of the fold lines is continuously unstraight and is in particular continuously curved. Moreover, it can be the case that not only one fold line, but all fold lines which connect the base surfaces with the gable surfaces do not run in a straight line, at least in sections, and are in particular curved or kinked.

According to a further embodiment of the package sleeve, the fold lines do not intersect, but maintain a minimum distance from one another in the range between 0.1 mm and 2.0 mm. In other words, although the fold lines approach one another, they do not form true points of intersection. The intersection of two fold lines approaching one another can for example be prevented in that at least one of these fold lines is interrupted in the region of the actual point of intersection. This design is based on the idea that intersecting fold lines represent a particularly high stress on the package sleeve which can lead to the package sleeve being damaged during folding. This can in turn lead to leaky packages. As a result, none of the fold lines intersect with one another but define extrapolated intersection points and wherein there is a region without fold lines between the fold lines and the intersection points extending a minimum distance in the range between 0.1 mm and 2.0 mm. By maintaining a "safety distance" between fold lines, these stresses can be reduced.

According to a further embodiment of the package sleeve, the base surfaces contain corner points of the package and the gable surfaces contain corner points of the package and no continuously straight fold line is provided between at least one corner point of the base surfaces and the associated corner point of the gable surfaces. The designation of the corner points is oriented on the corner points of the package which is to be produced from the package sleeve. The corner points can for example lie on the fold line between a base surface or gable surface and the adjacent "sleeve surface" (i.e. the front surface, the rear surface or a side surface). The corner points can also lie on the fold line between a triangular surface and a rectangular surface of a base surface or gable surface. Each corner point of a base surface is associated with a corresponding corner point of a gable surface, this being the corner point which is arranged above said corner point when the package is standing. Running through two associated corner points is a corner axis, which in a conventional cuboid package would correspond to a vertical package edge. According to this embodiment, no continuously straight fold line is arranged between at least one pair of associated corner points—i.e. on at least one corner axis. Preferably, no continuously straight fold lines are arranged in the case of several or all pairs of associated corner points—i.e. on several or all corner axes. Moreover, it can be the case that no fold line at all is arranged between at least one pair of associated corner points—i.e. on at least one corner axis. Finally, it can be the case that no fold lines at all are arranged in the case of several or all pairs of associated corner points—i.e. on several or all corner axes. That is to say, if possible no straight fold lines, or no continuously straight fold lines, are arranged on the corner axes. These embodiments avoid tangular package edges and make possible designs with more complex geometry.

According to one embodiment of the package sleeve, the package sleeve is folded flat along both secondary fold lines by an angle of in each case around 180°. This folding by an angle of around 180° makes possible particularly flat package sleeves. This allows package sleeves to be stacked in a space-saving manner, which facilitates transport for example. In this way, the package sleeves can be manufactured in a different location to that at which the filling and manufacture of the packages takes place. Preferably, the package sleeve is folded outwards along both secondary fold lines. This allows the package sleeves to be stacked particularly close to one another.

According to a further embodiment of the package sleeve, the two secondary fold lines run parallel to one another. Preferably, the two secondary fold lines are straight and run parallel to one another. This parallel arrangement has the advantage that the secondary fold lines can be stamped into the composite material particularly simply.

According to a further embodiment of the package sleeve, the two side surfaces, the front surface and the rear surface are limited by fold lines. The aforementioned surfaces can be limited by fold lines at the top (adjoining the gable surface) and/or at the bottom (adjoining the base surface). A lateral limitation of the aforementioned surfaces by fold lines is also possible.

A further embodiment of the package sleeve is characterised by at least one free-form surface which is arranged between two adjacent surfaces from the group of the two side surfaces, the front surface and the rear surface. A free-form surface is understood to mean a surface with a complex geometry. These are in particular surfaces which do not lie exclusively in a plane, but are curved. The free-form surface can only cover a part of the boundary between two adjacent surfaces from the group of the two side surfaces, the front surface and the rear surface, or can completely separate the adjacent surfaces from one another.

In connection with this embodiment of the package sleeve, it is further suggested that the at least one free-form surface is limited by fold lines. The free-form surface can be limited by fold lines at the top (adjoining the gable surface) and/or at the bottom (adjoining the base surface). A lateral limitation of the free-form surface by fold lines is also possible.

In this connection it is suggested that the gable surface adjoining the rear surface should have a shorter length than the length of the gable surface adjoining the front surface. This design leads to the front surface of the package having a lower height than the rear surface of the package. The package thus has a downward-sloping upper side. This can improve the pouring behaviour of the package. Moreover, a surface in the region of the upper side of the package can be made disproportionately large, so offering space for the attachment of an opening aid ("cap").

In connection with these embodiments of the package sleeve, it is further suggested that the base surfaces and the gable surfaces in each case comprise two rectangular surfaces and six triangular surfaces. Preferably, the rectangular surfaces and the triangular surfaces are also surrounded or limited by fold lines. The rectangular surfaces serve the purpose of folding the base and the gable of the package. The triangular surfaces are used to fold the surplus composite material into projecting "lugs" which are then laid against the package.

In this connection it is further suggested that the secondary fold lines run through the point of contact of three adjacent triangular surfaces of the base surface and through the point of contact of three adjacent triangular surfaces of the gable surfaces. This arrangement of the secondary fold lines has the advantage that the secondary fold lines run through the base surface and the gable surface at a point at which these surfaces need to be folded in any case, for example in order to form "lugs". The folding of the package sleeve along the secondary fold lines therefore already leads to a "pre-folding" of the fold line running centrally through the "lugs". A further advantage of the central arrangement of the secondary fold lines in the side surfaces is that the secondary fold lines limit the scope for the design of the edges of the package as little as possible. It can be the case that two of the triangular surfaces of the base surface and/or the gable surface have roughly the same surface area. Alternatively, it can be the case that all three triangular surfaces of the base surface and/or the gable surface have different surface areas.

According to a further embodiment of the package sleeve, the fold lines and/or the secondary fold lines are stamped from the inner side to the outer side of the package sleeve and/or from the outer side to the inner side of the package sleeve. Depending on the location and folding direction of a fold line, a change in the stamping direction can lead to better folding results. Moreover, in this way, outward-facing and raised lines—not intended for folding—can be created simultaneously, or in the same production step as the fold lines, serving for example to allow the package to be gripped better and held more securely. A combination of two stamping directions can be used in a package sleeve.

In a further embodiment of the package sleeve it is suggested that the composite material of the package sleeve has a weight in the range between 150 $g/m^2$ and 400 $g/m^2$, in particular between 200 $g/m^2$ and 250 $g/m^2$. A grammage or weight within this range has proved to be a good compromise between low costs and low weight (thinnest possible composite material) and sufficient mechanical properties (thickest possible composite material).

Finally, according to a further embodiment of the package sleeve, the longitudinal seam connects together two partial areas of the rear surface. According to this embodiment, the longitudinal seam should thus be arranged in the rear surface and divide this into two partial areas. This has the advantage that the front surface—to which the customer pays the most attention—can be produced without a seam. A further advantage of arranging the longitudinal seam in the rear surface is that the secondary fold lines arranged in the side surfaces do not collide with the longitudinal seam. The two partial areas of the rear surface can be of equal width (central longitudinal seam) or of different widths (laterally displaced longitudinal seam).

According to a further embodiment of the package sleeve, the composite material includes at least one layer of paper or paperboard which is covered on the edge of the longitudinal seam running within the package sleeve. The covering of the paper layer or paperboard layer has the purpose of preventing any contact between the contents of the package and this layer. This serves on the one hand to prevent liquid from leaking out through the—not liquid-tight—paper layer or paperboard layer and on the other hand to protect the contents of the package against contamination through the paper layer or paperboard layer (for example pulp fibres).

In connection with this embodiment it is further suggested that the layer of paper or paperboard is covered by a sealing strip and/or by turning over the composite material in the region of the longitudinal seam. One possibility for achieving said covering involves the attachment of a separate sealing strip. The sealing strip can for example be made from the same material as the innermost layer of the composite material and can be glued or welded to this layer. Another possibility for covering involves turning or folding over the composite material in the region of the longitudinal seam. In this way, not all layers, but only the innermost layer of the composite material now appears on the edge of the longitudinal seam running within the package sleeve. However, the innermost layer must in any case be made of a material which is suitable for contact with the contents of the package.

In a further embodiment of the package sleeve, the composite material is stripped in the region of the longitudinal seam. A "stripped" composite material is understood to mean a composite material which has fewer layers in the stripped region than in the other regions. Particularly in the region where several material layers overlap, stripping brings the advantage of a less pronounced increase in thickness. The use of stripped composite material is therefore particularly advantageous if the composite material is turned or folded over—for example in the region of the longitudinal seam.

According to a further embodiment, the package sleeve can be supplemented with a material weakening, in particular a coated hole, in one of the gable surfaces for fixing a pouring element. The material weakening serves to facilitate the later attachment of a pouring element. For this purpose, a hole is for example first punched through the composite material, which is then coated over. The coating can for example be carried out with a plastic foil, and serves to seal the package until application of the pouring element.

The problem described above is also solved through a package made of a composite material, wherein the package is folded along the fold lines, wherein the package is sealed in the region of the base surface and in the region of the gable surface, and wherein the partial areas of both side surfaces adjacent to the secondary fold lines are in each case arranged relative to one another in an angular range between 160° and 200°, in particular between 170° and 190°. The package is characterised in that it is manufactured from a package sleeve according to one of the claims 1 to 19.

Since the package is manufactured from one of the package sleeves described above, many properties and advantages of the package sleeve are also found in the package. One particular advantage is that the package has no tangular edges on its sides in the region of its sleeve surface, even though it was manufactured from a package sleeve which is folded in two places and thus has two fold edges. Preferably, the package does not have a continuously straight fold edge along at least one vertical corner axis; most preferably, the package does not have continuously straight fold edges on several or all vertical corner axes. This is achieved in that the package sleeve is "folded back" along the two secondary fold lines during the manufacture of the package, so that the partial areas of both side surfaces adjoining the secondary fold lines are in each case arranged in approximately the same plane. The secondary fold lines thus do not form the edges of the package, but lie—scarcely visible—in two almost flat outer surfaces of the package, namely in the two side surfaces. The package preferably has a volume in the range between 50 ml and 4000 ml, in particular between 80 ml and 1000 ml, most particularly between 200 ml and 350 ml. Preferably, the package is formed as a single part. In particular, the part of the package made of the composite material is in any case preferably formed as a single part. This part of the package can be supplemented with further elements, for example with a pouring element (for example a plastic flip cap or screw cap) or a drinking aid (for example a drinking straw). A further advantage of manufacturing the package from the package sleeves described above is that the design of the base can be varied, since the package sleeves are not yet welded in the region of the base surfaces.

According to one embodiment of the package, the front surface and the rear surface are arranged in planes lying roughly parallel to one another. Alternatively or additionally, the two side surfaces are arranged in planes lying roughly parallel to one another. This arrangement of the four large surfaces allows a compact combination of several packages for transport or storage purposes. Nevertheless, this arrangement of the surfaces does not necessarily lead to a rectangular cross-sectional profile, since the transitions between the surfaces are not rectangular or angular, but can for example be realised through curved surfaces, in particular through free-form surfaces.

A further embodiment of the package is characterised through lugs which are laid against the base surfaces in the lower region of the package. Alternatively or additionally, the package is characterised through lugs which are laid against the side surfaces in the upper region of the package. In the lower region of the package, the lugs can be laid against the base surface in different ways: in one base variant, the lugs are folded under the rectangular surfaces of the base and fixed in place there. Another base variant can, in contrast, have inward-pointing lugs which are arranged above the rectangular surfaces of the base which are folded in later. The first variant has the advantage that the lugs are pressed securely against the package through the dead weight of the filled package, whereas the second variant offers a particularly smooth base surface. Moreover, the package can be gripped securely without touching the lugs. The arrangement of the upper lugs on the side surfaces has the advantage that a pouring element can be arranged on the upper side of the package.

The problem described above is also solved through a method for manufacturing a package from a package sleeve made of a composite material. The method comprises the following steps: a) Providing a package sleeve according to one of the claims 1 to 19, b) unfolding the package sleeve along the fold lines between the side surfaces, the front surface and the rear surface, c) folding back the two side surfaces of the package sleeve along two secondary fold lines, and d) sealing the package sleeve in the region of the base surfaces. The method is characterised in that step d) is carried out both after step b) and also after step c). The method can be supplemented with the following step: e) formation of free-form surfaces through deformation of the composite material. Step e) can take place before filling the package and/or after filling and sealing the package.

As already described above, the method is also based on the idea of manufacturing a package from a package sleeve the fold edges of which do not form edges of the package produced from this. This is made possible in that the package sleeve, folded along secondary fold lines, is "folded back", whereby the folding along the secondary fold lines is reversed. The secondary fold lines provided in the package sleeve thus do not form edges of the package; instead, they are arranged between the edges of the package (in this case: in the side surfaces). Naturally, the package sleeve is folded in the region of other fold lines, which do not however necessarily need to be formed into tangular fold edges, and the path of which can also be curved. This allows the manufacture of packages with complex geometry. Moreover, different base configurations can be achieved in that the package sleeve is first sealed in the region of the base surfaces after the sleeve has been unfolded and folded back.

According to one embodiment of the method, the steps b) and c) are carried out simultaneously. The steps b) and c) can be carried out simultaneously only in phases or also continuously. A simultaneous performance of "unfolding" and "folding back" has the advantage that both folding operations can be carried out in the same machine and possibly using the same tool. This can for example be achieved in that the two fold edges of the package sleeves formed through the secondary fold lines are moved towards one another, whereby the package sleeve opens. The folding along the vertical fold lines between the side surfaces, the front surface and the rear surface can be ensured in that the opening of the package sleeve takes place in a—preferably multiple-part—mould, the inner contour of which corresponds to the outer contour of the package ("forming press").

Finally, according to a further embodiment of the method, after being folded back, the partial areas of a side surface of the package adjoining the secondary fold lines in each case once again lie in an angular range between 160° and 200°, in particular between 170° and 190° relative to one another. The side surfaces should thus be folded back so far along the secondary fold lines that the side surfaces form virtually flat side surfaces.

BRIEF DESCRIPTION OF THE DRAWING

The invention is explained in more detail in the following with reference to a drawing which simply represents a preferred exemplary embodiment. In the drawing:

FIG. 2A: shows a sleeve blank for manufacturing a first embodiment of a package sleeve according to the invention, FIG. 2B: shows a first embodiment of a package sleeve according to the invention which is formed from the sleeve blank shown in FIG. 2A in a front view, FIG. 2C: shows the package sleeve from FIG. 2B in a rear view, FIG. 2D: shows the package sleeve from FIG. 2B and FIG. 2C in the unfolded state, FIG. 2E: shows the package sleeve from FIG. 2D with pre-folded base and gable surfaces, FIG. 2E': shows the package sleeve from FIG. 2D with pre-folded base and gable surfaces, FIG. 3A: shows a sleeve blank for manufacturing a second embodiment of a package sleeve according to the invention, FIG. 3B: shows a second embodiment of a package sleeve according to the invention which is formed from the sleeve blank shown in FIG. 3A in a front view, FIG. 3C: shows the package sleeve from FIG. 3B in a rear view, FIG. 3D: shows the package sleeve from FIG. 3B and FIG. 3C in the unfolded state, FIG. 3E: shows the package sleeve from FIG. 3D with pre-folded base and gable surfaces, FIG. 3E': shows the package sleeve from FIG. 3D with pre-folded base and gable surfaces.

DESCRIPTION OF THE INVENTION

Figure 1A:
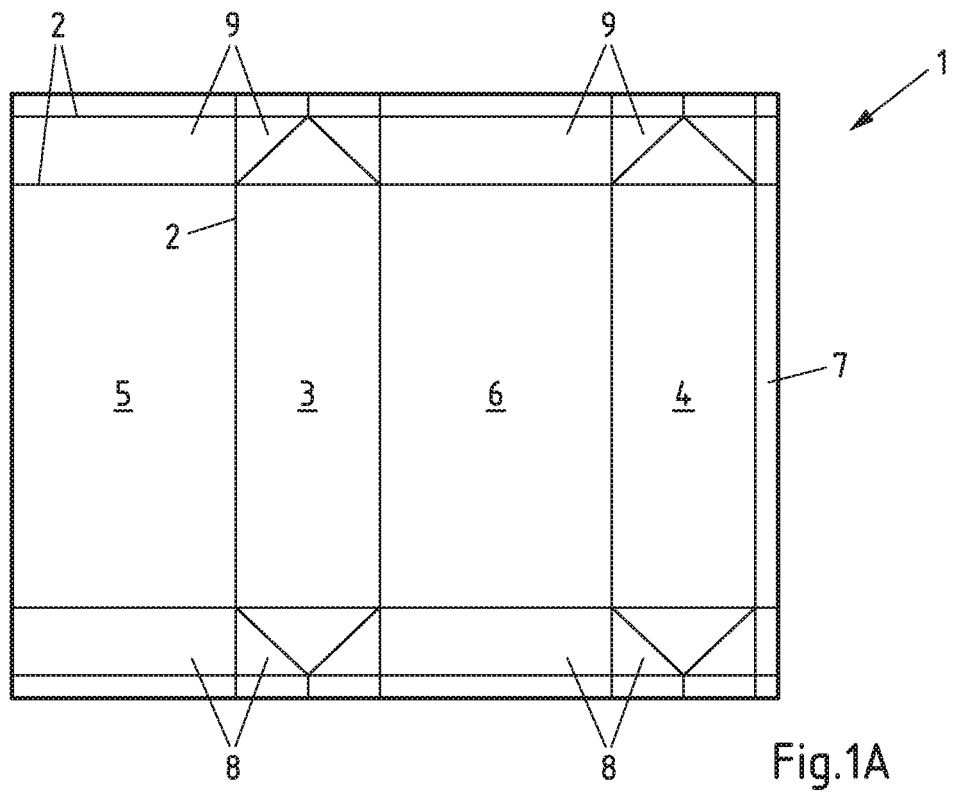
FIG. 1A: shows a sleeve blank intended for folding into a package sleeve known from the prior art.

FIG. 1A shows a sleeve blank 1, known from the prior art, from which a package sleeve can be formed. The sleeve blank 1 can comprise several layers of different materials, for example paper, paperboard, plastic or metal, in particular aluminium. The sleeve blank 1 has several fold lines 2 which are intended to facilitate the folding of the sleeve blank 1 and which divide the sleeve blank 1 into several surfaces. The sleeve blank 1 can be divided into a first side surface 3, a second side surface 4, a front surface 5, a rear surface 6, a sealing surface 7, base surfaces 8 and gable surfaces 9. A package sleeve can be formed from the sleeve blank 1 in that the sleeve blank 1 is folded such that the sealing surface 7 can be connected, in particular welded, with the front surface 5.

Figure 1B:
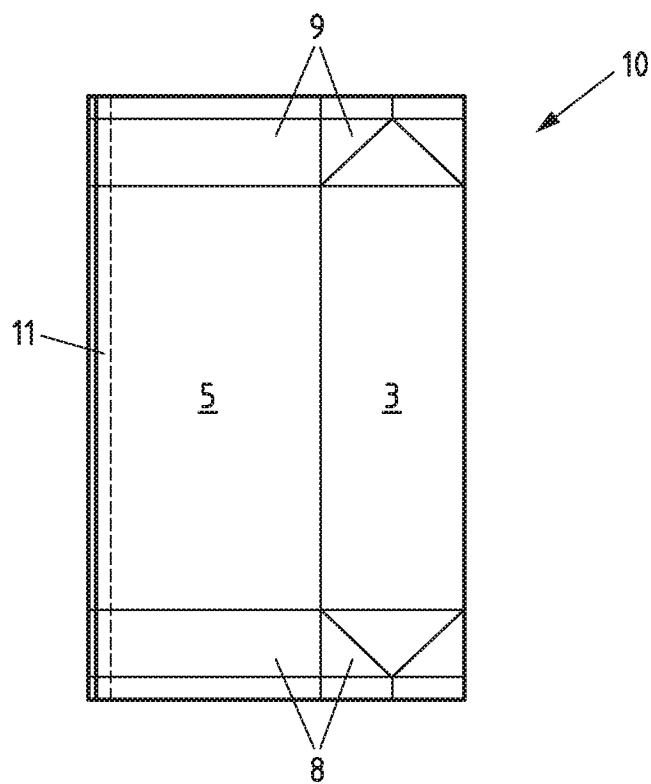
FIG. 1B: shows a package sleeve known from the prior art, formed from the sleeve blank shown in FIG. 1A, in the flat folded state.

FIG. 1B shows a package sleeve 10 known from the prior art in the flat folded state. The regions of the package sleeve already described in connection with FIG. 1A are provided with corresponding reference numbers in FIG. 1B. The package sleeve 10 is formed from the sleeve blank 1 shown in FIG. 1A. For this purpose, the sleeve blank 1 has been folded such that the sealing surface 7 and the front surface 5 are arranged so as to overlap, so that the two surfaces can be surface-welded together. As a result, a longitudinal seam 11 is created. FIG. 1B shows the package sleeve 10 in a flat folded-up state. In this state, a side surface 4 (concealed in FIG. 1B) lies beneath the front surface 5 while the other side surface 3 lies on the rear surface 6 (concealed in FIG. 1B). In the flat folded-up state, several package sleeves 10 can be stacked in a particularly space-saving manner. Therefore, the package sleeves 10 are frequently stacked at the place of manufacture and transported in stacked form to the location where filling takes place. Only there are the package sleeves 10 unstacked and unfolded—in most cases already within a filling machine—so that they can be filled with contents, for example with foodstuffs. The filling can take place under aseptic conditions.

Figure 1C:
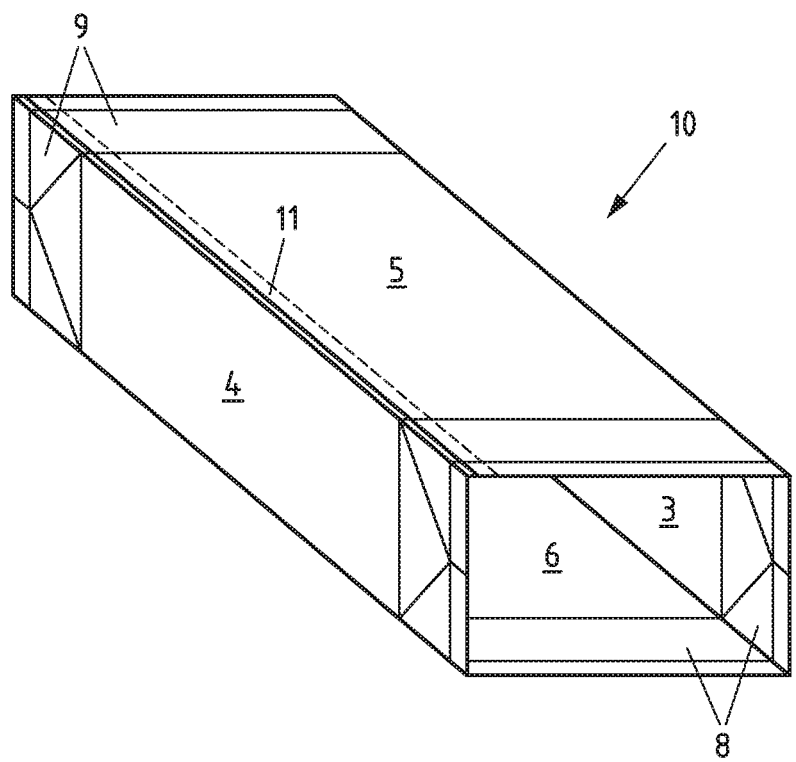
FIG. 1C: shows the package sleeve from FIG. 1B in the unfolded state.

FIG. 1C shows the package sleeve 10 from FIG. 1B in the unfolded state. Here too, the regions of the package sleeve 10 already described in connection with FIG. 1A or FIG. 1B are provided with corresponding reference numbers. The unfolded state refers to a configuration in which an angle of around 90° is formed between the two in each case adjacent surfaces 3, 4, 5, 6, so that the package sleeve 10 assumes a square or rectangular cross section, depending of the shape of these surfaces. Accordingly, the opposite side surfaces 3, 4 are arranged parallel to one another. The same applies to the front surface 5 and the rear surface 6.

Figure 1D:
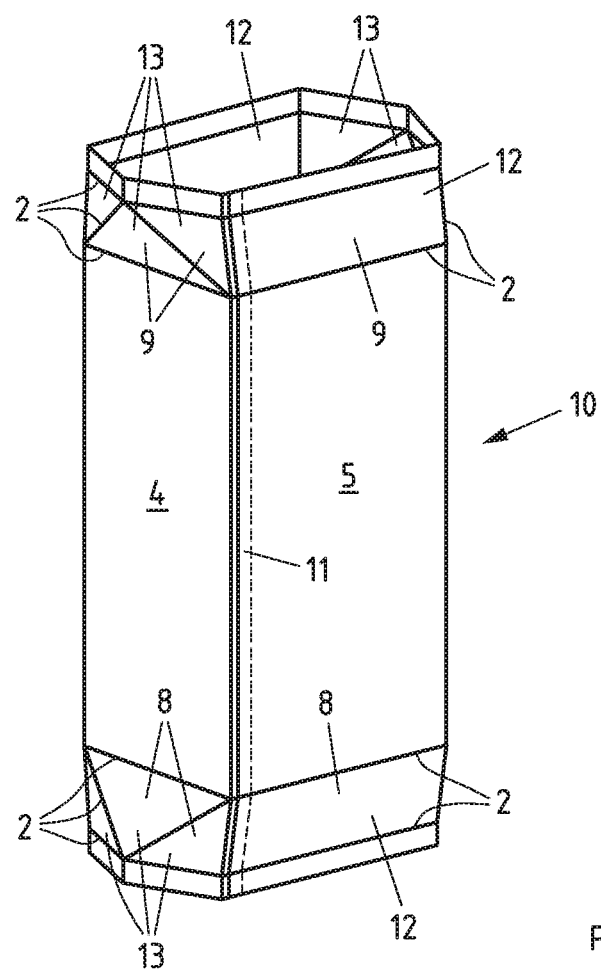
FIG. 1D: shows the package sleeve from FIG. 1C with pre-folded base and gable surfaces.

FIG. 1D shows the package sleeve 10 from FIG. 1C in the pre-folded state, i.e. in a state in which the fold lines 2 have been pre-folded both in the region of the base surfaces 8 as well as in the region of the gable surfaces 9. Those regions of the base surfaces 8 and the gable surfaces 9 which adjoin the front surface 5 and the rear surface 6 are also referred to as rectangular surfaces 12. The rectangular surfaces 12 are folded inwards during the pre-folding and later form the base or the gable of the package. Those regions of the base surfaces 8 and the gable surfaces 9 which adjoin the side surfaces 3, 4 are, in contrast, referred to as triangular surfaces 13. The triangular surfaces 13 are folded outwards during the pre-folding and form projecting regions of surplus material which are also referred to as "lugs" 14 and in a later manufacturing step are folded and fixed against the package, for example using an adhesive bonding process.

Figure 1E:
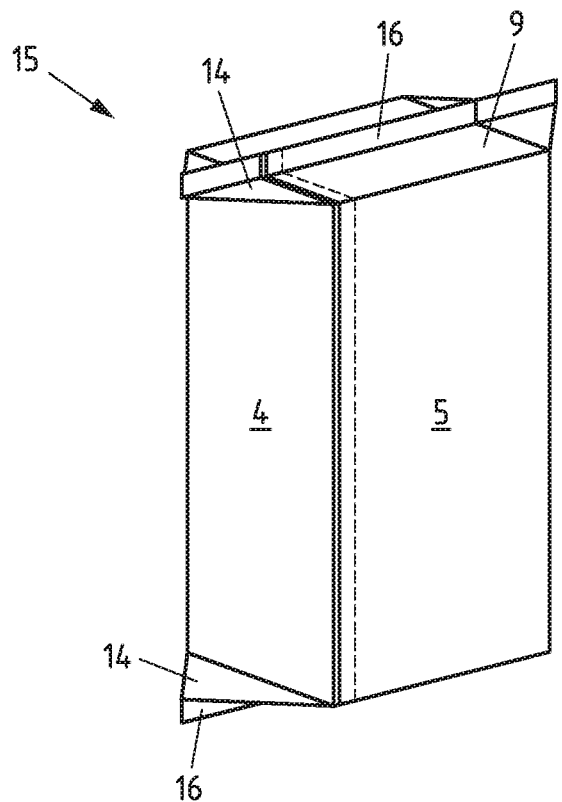
FIG. 1E: shows a package, known from the prior art, which is formed from the sleeve blank shown in FIG. 1A, after welding.

FIG. 1E shows a package 15 known from the prior art which is formed from the sleeve blank shown in FIG. 1A. The package 15 is shown after welding, i.e. in the filled and sealed state. After sealing, a fin seam 16 is created in the region of the base surfaces 8 and in the region of the gable surfaces 9. In FIG. 1E the lugs 14 and the fin seam 16 project. Both the lugs 14 and also the fin seam 16 are folded flat in a later manufacturing step, for example by means of a welding process, in particular one comprising activation and pressing.

Figure 1F:
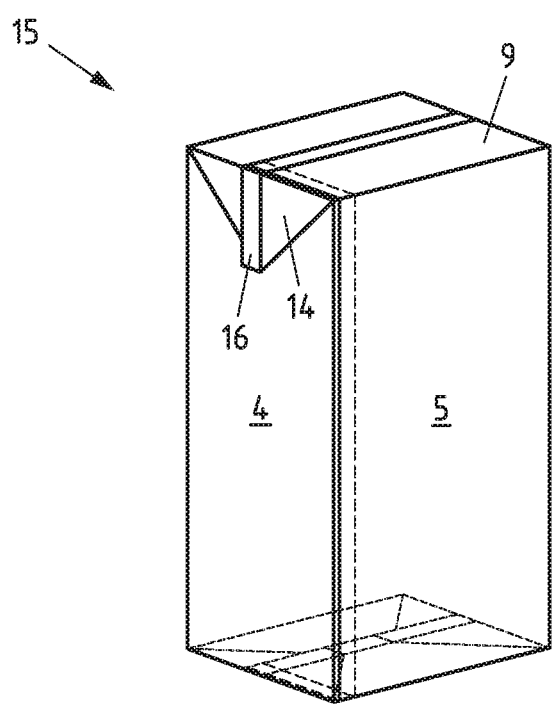
FIG. 1F: shows the package from FIG. 1E with folded-in lugs.

FIG. 1F shows the package 15 from FIG. 1E with folded-in lugs 14. Moreover, the fin seams 16 are also folded flat against the package 15. The upper lugs 14 arranged in the region of the gable surface 9 are folded downwards and fixed flat against the two side surfaces 3, 4. Preferably, the upper lugs 14 are adhesively bonded or welded to the two side surfaces 3, 4. The lower lugs 14 arranged in the region of the base surface 8 are folded downwards, but are fixed flat against the underside of the package 15, which is formed by two rectangular surfaces 12 of the base surface 8. Preferably, the lower lugs 14 are also adhesively bonded or welded together with the package 15—in particular with the rectangular surfaces 12.

FIG. 2A shows a sleeve blank 1' for manufacturing a first embodiment of a package sleeve according to the invention. The regions of the sleeve blank already described in connection with FIG. 1A to FIG. 1F are provided with corresponding reference numbers in FIG. 2A. The base surface 8 and the gable surface 9 are unchanged in the sleeve blank 1' in comparison with the sleeve blank 1 from FIG. 1A. However, there are differences in the arrangement of those fold lines 2' which divide the four large surfaces (i.e. the two side surfaces 3, 4, the front surface 5 and the rear surface 6) from one another. The four large surface 3, 4, 5, 6 are no longer in each case separated from one another by a straight fold line 2; instead, the four large surfaces 3, 4, 5, 6 are in each case separated from one another by two curved fold lines 2', between which a free-form surface 17 is in each case arranged. A further difference is that the two side surfaces 3, 4 of the sleeve blank 1' in each case contain a secondary fold line 18. The two secondary fold lines 18 are straight and run parallel to one another. Moreover, the secondary fold lines 18 run through a point of contact SB of three adjacent triangular surfaces 13 of the base surface 8 and through a point of contact SG of three adjacent triangular surfaces 13 of the gable surfaces 9.

The base surfaces 8 form four corner points E8 and the gable surfaces 9 form four corner points E9. The corner points E8, E9 represent corner points of the package which is to be produced from the sleeve blank 1'. Each corner point E8 of a base surface 8 is associated with a corresponding corner point E9 of a gable surface 9, which is in each case the corner point E9 which, when the package is standing, is arranged above this corner point E8. A corner axis EA runs through two associated corner points E8, E9 which, in a conventional cuboid package, would correspond to a vertical package edge. Four corner axes EA are therefore present in the sleeve blank 1' shown in FIG. 2A—also in the package sleeve produced from this and the package produced from this package sleeve (for reasons of clarity, only one corner axis EA is in each case drawn in). No fold lines are provided between the corner points E8 of the base surfaces 8 and the corner points E9 of the gable surfaces 9 associated therewith—i.e. along the corner axes EA.

FIG. 2B shows a first embodiment of a package sleeve according to the invention 10', which is formed from the sleeve blank 1' shown in FIG. 2A, in a front view. The regions of the package sleeve already described in connection with FIG. 1A to FIG. 2A are provided with corresponding reference numbers in FIG. 2B. The package sleeve 10' has been created from the sleeve blank 1' through two steps: Firstly, the sleeve blank 1' is folded along the two secondary fold lines 18. The two partial areas 6A, 6B of the divided rear surface 6 are then connected to one another, in particular welded together, in the region of the sealing surface 7, creating a longitudinal seam 11 (concealed in FIG. 2B). The package sleeve 1' thus has a circumferential structure, closed in the circumferential direction, with an opening in the region of the base surface 8 and with an opening in the region of the gable surface 9. The edge of the longitudinal seam 11 running within the package sleeve 10' is thereby covered. The covering of the open cut edge of the composite material has the purpose of preventing any contact between the contents of the package and this layer, in particular the paper layer or paperboard layer contained therein. The covering of the cut edge is in this case achieved by folding over the composite layer after it has been stripped beforehand. In the front view, the centrally-located front surface 5, which is limited on both sides by fold lines 2', is visible. To either side, partial areas 3A, 4A of the side surfaces 3, 4 can be seen which are also limited laterally by fold lines 2'. The other partial areas 3B, 4B of the side surfaces 3, 4 are on the rear side of the package sleeve 10' and are therefore hidden in FIG. 2B. Free-form surfaces 17 are provided between the fold lines 2'. The free-form surfaces 17 are arranged in the regions of the package sleeve 10' which later form the (non-rectangular) "edges" of a package.

FIG. 2C shows the package sleeve 1' from FIG. 2B in a rear view. The regions of the package sleeve already described in connection with FIG. 1A to FIG. 2B are provided with corresponding reference numbers in FIG. 2C. In the rear view, the centrally-located rear surface 6 is visible which comprises two partial areas 6A, 6B connected by the longitudinal seam 11 and which is limited on both sides by fold lines 2'. To either side, partial areas 3B, 4B of the side surfaces 3, 4 can be seen which are also limited laterally by fold lines 2'. The other partial areas 3A, 4A of the side surfaces 3, 4 are on the front side of the package sleeve 10' and are therefore hidden in FIG. 2C. Free-form surfaces 17 are also provided between the fold lines 2' on the rear side of the package sleeve 10'. The free-form surfaces 17 are arranged in the regions of the package sleeve 10' which later form the (non-rectangular) "edges" of a package body. At least one free-form surface (17) is provided extending between the base surfaces (8) and the gable surfaces (9), and wherein two fold lines (2, 2'), which are curved in sections and straight in other sections, laterally limit the free-form surface (17) towards two adjacent surfaces (3, 4, 5, 6) from the group of the two side surfaces (3, 4), the front surface (5) and the rear surface (6).

FIG. 2D shows the package sleeve 1' from FIG. 2B and FIG. 2C in the unfolded state. The regions of the package sleeve already described in connection with FIG. 1A to FIG. 2C are provided with corresponding reference numbers in FIG. 2D. The unfolded state can be achieved through several folding steps: Firstly, the package sleeve 10' is folded along the fold lines 2', which are arranged between the four large surfaces 3, 4, 5, 6 and the four free-form surfaces 17. Secondly, the package sleeve 1' is folded back along the secondary fold lines 18 running through the side surfaces 3, 4. The sleeve is folded back by around 180°. This folding back along the secondary fold lines 18 has the consequence that the two partial areas 3A, 3B of the first side surface 3 adjoining the secondary fold line 18 no longer lie on top of one another but are arranged in the same plane. In a corresponding manner, the folding back along the secondary fold lines 18 has the consequence that the two partial areas 4A, 4B of the second side surface 4 adjoining the secondary fold line 18 no longer lie on top of one another but are arranged in the same plane. The package sleeve 10' is therefore only folded along the secondary fold lines 18 in its flat state (FIG. 2B, FIG. 2C); in the unfolded state (FIG. 2D), the package sleeve 10' (like the package which is to be formed out of it) is, in contrast, no longer folded along the secondary fold lines 18. Thus the designation as "secondary" fold lines 18.

FIG. 2E shows the package sleeve 10' from FIG. 2D with pre-folded base and gable surfaces. The regions of the package sleeve already described in connection with FIG. 1A to FIG. 2D are provided with corresponding reference numbers in FIG. 2E. The pre-folded state refers (as in FIG. 1D) to a state in which the fold lines 2' have been pre-folded, both in the region of the base surfaces 8 as well as in the region of the gable surfaces 9. Those regions of the base surfaces 8 and the gable surfaces 9 which adjoin the front surface 5 and the rear surface 6 are also referred to as rectangular surfaces 12. The rectangular surfaces 12 are folded inwards during the pre-folding and later form the base or the gable of the package. Those regions of the base surfaces 8 and the gable surfaces 9 which adjoin the side surfaces 3, 4 are, in contrast, referred to as triangular surfaces 13. The triangular surfaces 13 are folded outwards during the pre-folding and form projecting regions of surplus material which are also referred to as "lugs" 14 and in a later manufacturing step are folded and fixed against the package, for example using an adhesive bonding process.

FIG. 2E' also shows the package sleeve 10' from FIG. 2D with pre-folded base and gable surfaces, for which reason corresponding reference numbers are also used here. The difference in comparison with FIG. 2E is that the triangular surfaces 13 are not folded outwards, but inwards.

Figure 2F:
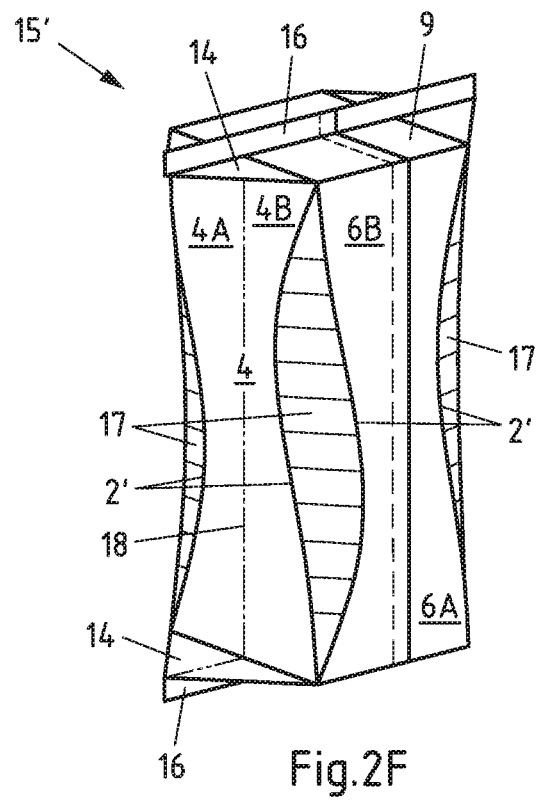
FIG. 2F: shows a first embodiment of a package according to the invention which is formed from the package sleeve shown in FIG. 2B after welding, FIG. 2F': shows a first embodiment of a package according to the invention which is formed from the package sleeve shown in FIG. 2B after welding.
Figure 2F:
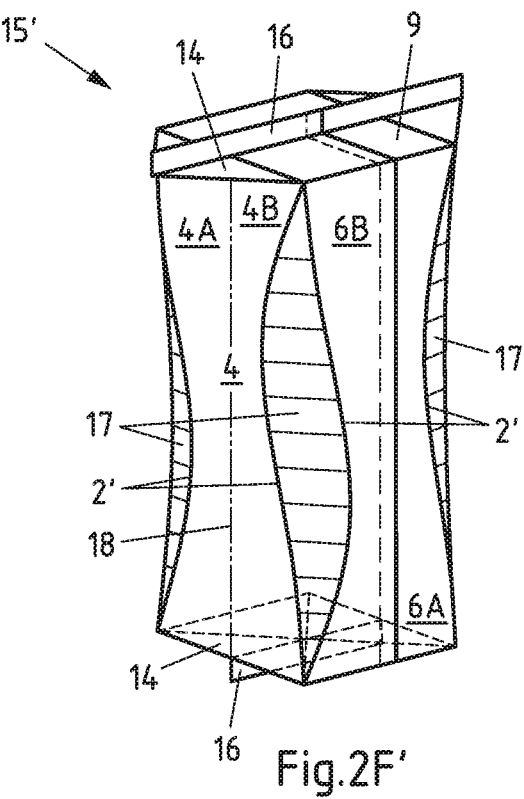

FIG. 2F shows a first embodiment of a package 15' according to the invention, which is formed from the package sleeve 10' shown in FIG. 2B, after welding. The regions of the package already described in connection with FIG. 1A to FIG. 2E are provided with corresponding reference numbers in FIG. 2E. The package 15' is shown after welding, i.e. in the filled and sealed state. After sealing, a fin seam 16 is created in the region of the base surfaces 8 and in the region of the gable surfaces 9. In FIG. 2F the lugs 14 and the fin seam 16 project. Both the lugs 14 and also the fin seam 16 are folded and fixed flat in a later manufacturing step, for example by means of an adhesive bonding or welding process.

FIG. 2F' also shows a first embodiment of a package 15' according to the invention, which is formed from the package sleeve 10' shown in FIG. 2B, after welding. Corresponding reference numbers are therefore also used here. The difference in comparison with FIG. 2F is that the triangular surfaces 13 are not folded outwards prior to welding, but inwards. Therefore, the "lugs" 14 do not project outwards, but extend inwards. This leads to a shorter fin seam 15.

Figure 2G:
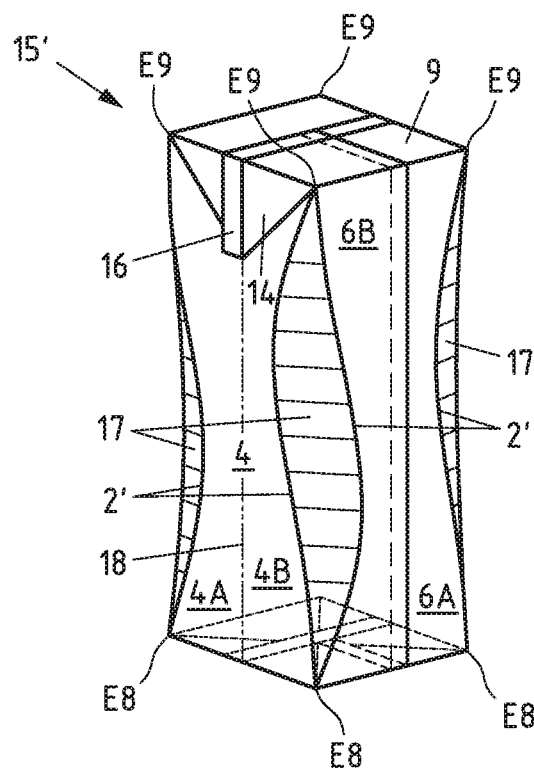
FIG. 2G: shows the package from FIG. 2F with folded-in lugs, FIG. 2G': shows the package from FIG. 2F' with folded-in fin seam.
Figure 2G:
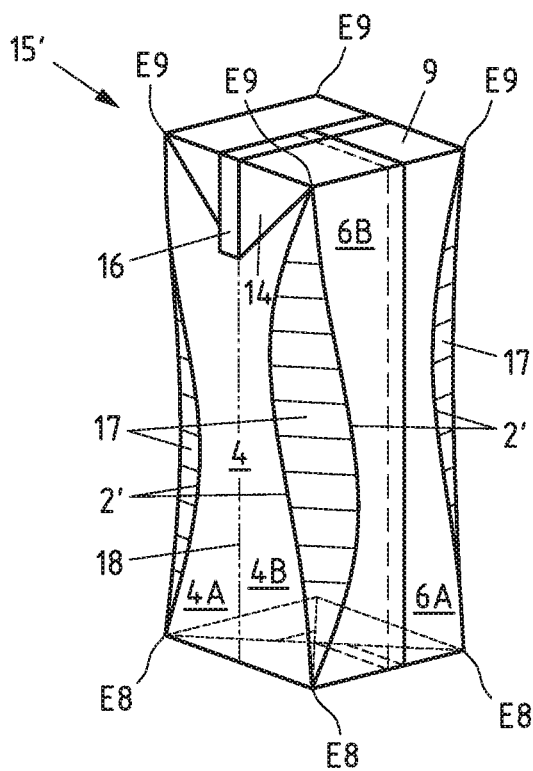

FIG. 2G shows the package 15' from FIG. 2F with folded-in lugs 14. The regions of the package already described in connection with FIG. 1A to FIG. 2F are provided with corresponding reference numbers in FIG. 2G. As well as the lugs 14, the fin seams 16 are also folded against the package 15'. The upper lugs 14 arranged in the region of the gable surface 9 are folded downwards and fixed flat against the two side surfaces 3, 4. Preferably, the upper lugs 14 are adhesively bonded or welded to the two side surfaces 3, 4. The lower lugs 14 arranged in the region of the base surface 8 are folded downwards, but are fixed flat against the underside of the package 15', which is formed by two rectangular surfaces 12 of the base surface 8. Preferably, the lower lugs 14 are also adhesively bonded or welded together with the package 15'—in particular with the rectangular surfaces 12. In the package 15' represented in FIG. 2G, the front surface 5 and the rear surface 6 are arranged parallel to one another. The two side surfaces 3, 4 are also arranged parallel to one another in the package 15'. Angles of around 90° are in each case formed between adjacent surfaces of the four large surfaces 3, 4, 5, 6. However (unlike the package 15 from FIG. 1F), the transition between the four large surface 3, 4, 5, 6 is created not through tangular edges, but through free-form surfaces 17 of geometrically complex form.

FIG. 2G' shows the package 15' from FIG. 2F' with folded-in fin seam 16. Corresponding reference numbers are therefore also used here. The fin seam 16 is folded over and laid flat against the underside of the package 15', which is formed through two rectangular surfaces 12 of the base surface 8. Preferably, the fin seam 16 is adhesively bonded or welded with the package 15'—in particular with a rectangular surface 12. The difference in comparison with FIG. 2G lies in the structure of the base of the package 15': In FIG. 2G the lugs 14 are arranged beneath the rectangular surfaces 12 and are thus visible from the underside; in FIG. 2G', in contrast, the rectangular surfaces 12 are arranged beneath the lugs 14 and are thus visible from the underside.

FIG. 3A shows a sleeve blank 1" for manufacturing a second embodiment of a package sleeve according to the invention. The sleeve blank 1" in FIG. 3A largely corresponds to the sleeve blank 1 in FIG. 2A, so that corresponding reference numbers are also used here. One difference lies in the form of the gable surface 9: whereas the length L8 of the base surface 8 is constant over the entire width of the sleeve blank 1", the length of the gable surface 9 has different values. Adjacent to the rear surface 6, the gable surface 9 has a reduced length $L9_{min}$. Adjacent to the front surface 5, the gable surface 9 has, in contrast, an increased length $L9_{max}$. This design means that the front surface 5 has a lesser height than the rear surface 6. The side surfaces 3, 4 provide a transition between the different heights of the front surface 5 and the rear surface 6, for which reason, in the case of the sleeve blank 1" (unlike the sleeve blank 1 and the sleeve blank 1'), the side surfaces 3, 4 are not rectangular, but have an obliquely sloping upper edge. In the case of the sleeve blank 1" too, the two side surfaces 3, 4 each contain a secondary fold line 18. The two secondary fold lines 18 are straight and run parallel to one another. Moreover, the secondary fold lines 18 run through a point of contact SB of three adjacent triangular surfaces 13 of the base surface 8 and through a point of contact SG of three adjacent triangular surfaces 13 of the gable surfaces 9.

FIG. 3B shows a second embodiment of a package sleeve according to the invention 10", which is formed from the sleeve blank 1" shown in FIG. 3A, in a front view. The package sleeve 10" in FIG. 3B largely corresponds to the package sleeve 10' in FIG. 2B, so that corresponding reference numbers are also used here. One difference lies in the increased length $L9_{max}$ of the gable surface 9 in its region adjoining the front surface 5.

FIG. 3C shows the package sleeve 10" from FIG. 3B in a rear view. The package sleeve 10" in FIG. 3C largely corresponds to the package sleeve 10' in FIG. 2C, so that corresponding reference numbers are also used here. One difference lies in the reduced length $L9_{min}$ of the gable surface 9 in its region adjoining the rear surface 6.

FIG. 3D shows the package sleeve 10" from FIG. 3B and FIG. 3C in the unfolded state. The package sleeve 10" in FIG. 3D largely corresponds to the package sleeve 10' in FIG. 2D, so that corresponding reference numbers are also used here. One difference lies in the increased length $L9_{max}$ of the gable surface 9 in its region adjoining the front surface 5 as well as in the reduced length $L9_{min}$ of the gable surface 9 in its region adjoining the rear surface 6.

FIG. 3E shows the package sleeve 10" from FIG. 3D with pre-folded base and gable surfaces. The package sleeve 10" in FIG. 3E largely corresponds to the package sleeve 10' in FIG. 2E, so that corresponding reference numbers are also used here. One difference lies in the increased length $L9_{max}$ of the gable surface 9 in its region adjoining the front surface 5 as well as in the reduced length $L9_{min}$ of the gable surface 9 in its region adjoining the rear surface 6.

FIG. 3E' also shows the package sleeve 10" from FIG. 3D with pre-folded base and gable surfaces, for which reason corresponding reference numbers are also used here. The difference in comparison with FIG. 3E is that the triangular surfaces 13 are not folded outwards, but inwards.

Figure 3F:
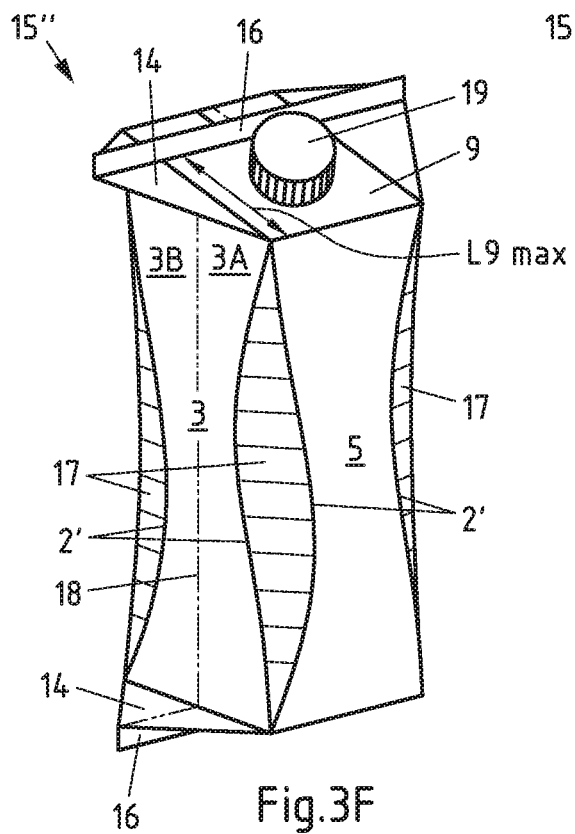
FIG. 3F: shows a second embodiment of a package according to the invention which is formed from the package sleeve shown in FIG. 3B after welding, FIG. 3F': shows a second embodiment of a package according to the invention which is formed from the package sleeve shown in FIG. 3B after welding.
Figure 3F:
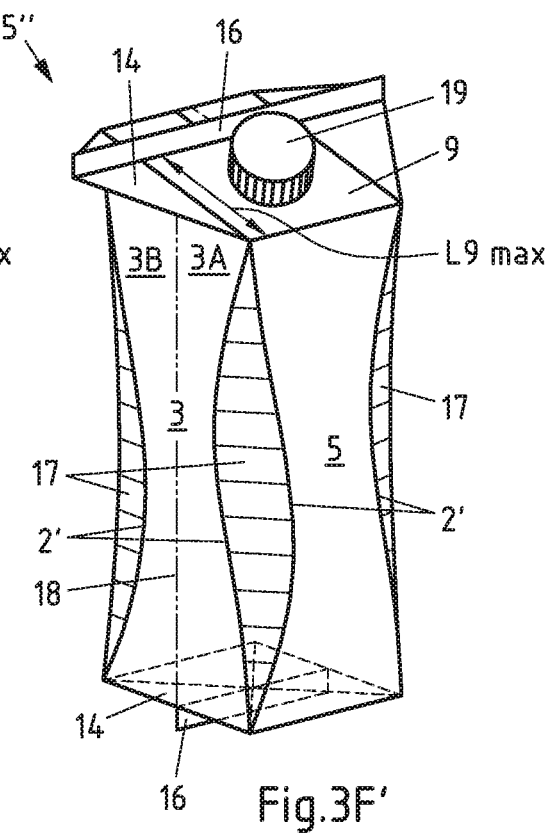

FIG. 3F shows a second embodiment of a package according to the invention 15", which is formed from the package sleeve 10" shown in FIG. 3B, after welding. The package 15" in FIG. 3F largely corresponds to the package 15' in FIG. 2F, so that corresponding reference numbers are also used here. One difference lies in the increased length $L9_{max}$ of the gable surface 9 in its region adjoining the front surface 5 as well as in the reduced length $L9_{min}$ of the gable surface 9 in its region adjoining the rear surface 6. The increased length $L9_{max}$ of the gable surface 9 leads to a large surface which can be used for a pouring element 19.

FIG. 3F' also shows a second embodiment of a package according to the invention 15", which is formed from the package sleeve 10" shown in FIG. 3B, after welding. Corresponding reference numbers are therefore also used here. The difference in comparison with FIG. 3F is that the triangular surfaces 13 were not folded outwards, but inwards prior to welding. Therefore, the "lugs" 14 do not project outwards, but extend inwards. This leads to a shorter fin seam 15.

Figure 3G:
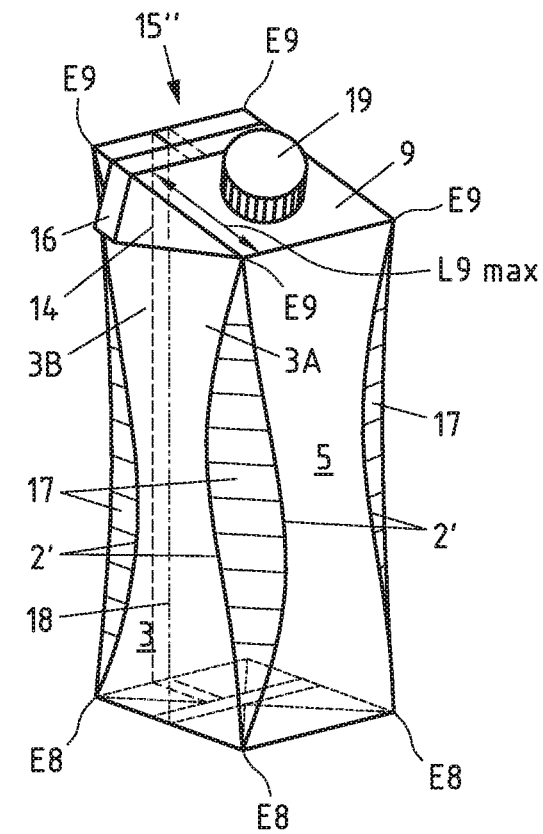
FIG. 3G: shows the package from FIG. 3F with folded-in lugs, and FIG. 3G': shows the package from FIG. 3F' with folded-in fin seam.
Figure 3G:
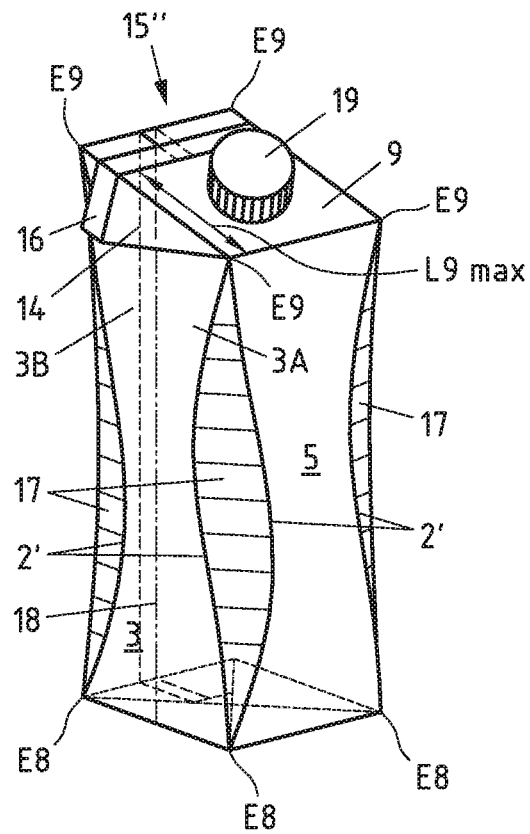

FIG. 3G shows the package 15" from FIG. 3F with folded-in lugs 14. The package 15" in FIG. 3G largely corresponds to the package 15' in FIG. 2G, so that corresponding reference numbers are also used here. Here too, one difference lies in the increased length $L9_{max}$ of the gable surface 9 in its region adjoining the front surface 5 as well as in the reduced length $L9_{min}$ of the gable surface 9 in its region adjoining the rear surface 6. The increased length $L9_{max}$ of the gable surface 9 leads to a large surface which can be used for a pouring element 19.

Finally, FIG. 3G' shows the package 15" from FIG. 3F' with folded-in fin seam 15. Corresponding reference numbers are therefore also used here. The fin seam 15 is folded over and laid flat against the underside of the package 15", which is formed by two rectangular surfaces 12 of the base surface 8. Preferably, the fin seam 15 is adhesively bonded or welded with the package 15"—in particular with a rectangular surface 12. The difference in comparison with FIG. 3G lies in the structure of the base of the package 15": in FIG. 3G the lugs 14 are arranged beneath the rectangular surfaces 12 and are thus visible from the underside; in FIG. 3G', in contrast, the rectangular surfaces 12 are arranged beneath the lugs 14 and are thus visible from the underside.

LIST OF REFERENCE NUMERALS 1, 1', 1": sleeve blank
2, 2': fold line
3, 4: side surface
3A, 3B, 4A, 4B: partial area (of the side surface 3, 4)
5: front surface
6: rear surface
6A, 6B: partial area (of the rear surface 6)
7: sealing surface
8: base surface
9: gable surface
10, 10', 10": package sleeve
11: longitudinal seam
12: rectangular surface
13: triangular surface
14: lug
15, 15', 15": package
16: fin seam
17: free-form surface
18: secondary fold line
19: pouring element
L8: length (of the base surface 8)
$L9_{min}$: minimum length (of the gable surface 9)
$L9_{max}$: maximum length (of the gable surface 9)
EA: corner axis
E8: corner points (of the base surface 8)
E9: corner points (of the gable surface 9)
SB: point of contact (of the triangular surfaces 13 of the base surface 8)
SG: point of contact (of the triangular surfaces 13 of the gable surface 9)

The invention claimed is:

1. A package sleeve made of a composite material for the manufacture of a package, comprising:
a front surface,
a rear surface,
two side surfaces,
base surfaces and gable surfaces which are arranged on opposite sides of the two side surfaces, the front surface and the rear surface, and
a longitudinal seam which connects two edges of the composite material to form a circumferential package sleeve,
wherein the package sleeve has several fold lines,
wherein the two side surfaces in each case have a secondary fold line running through the side surface, and
wherein the package sleeve is exclusively folded along both secondary fold lines,
wherein the package sleeve is open both in the region of the base surfaces and in the region of the gable surfaces,
wherein the composite material includes at least one layer of paper or paperboard which is covered on an edge of the longitudinal seam running within the package sleeve,
wherein none of the fold lines intersect with one another but define extrapolated intersection points and wherein there is a region without fold lines between the fold lines and the intersection points extending a minimum distance in the range between 0.1 mm and 2.0 mm, and
wherein at least one free-form surface is provided, the free-form surface extending between the base surfaces and the gable surfaces, and wherein two fold lines, which are curved in sections and straight in other sections, laterally limit the free-form surface towards two adjacent surfaces from the group of the two side surfaces, the front surface and the rear surface.

2. The package sleeve according to claim 1, wherein at least one of the fold lines does not run in a straight line, at least in sections, and is in particular curved or kinked.

3. The package sleeve according to claim 1, wherein the base surfaces contain corner points of the package and that the gable surfaces contain corner points of the package and that no continuously straight fold line is provided between at least one corner point of the base surfaces and the corner point of the gable surfaces associated therewith.

4. The package sleeve according to claim 1, wherein the package sleeve is folded flat along both secondary fold lines by an angle of in each case around 180°.

5. The package sleeve according to claim 1, wherein the two secondary fold lines run parallel to one another.

6. The package sleeve according to claim 1, wherein the two side surfaces, the front surface and the rear surface are limited by fold lines.

7. The package sleeve according to claim 1, further comprising at least one free-form surface which is arranged between two adjacent surfaces from the group of the two side surfaces, the front surface and the rear surface.

8. The package sleeve according to claim 7, wherein the at least one free-form surface is limited by fold lines.

9. The package sleeve according to claim 1, wherein the gable surface adjoining the rear surface has a shorter length than the length of the gable surface adjoining the front surface.

10. The package sleeve according to claim 1, wherein the base surfaces and the gable surfaces in each case comprise two rectangular surfaces and six triangular surfaces.

11. The package sleeve according to claim 10, wherein the secondary fold lines run through the point of contact of three adjacent triangular surfaces of the base surface and through the point of contact of three adjacent triangular surfaces of the gable surfaces.

12. The package sleeve according to claim 1, wherein the fold lines and/or the secondary fold lines are stamped from the inner side to the outer side of the package sleeve and/or from the outer side to the inner side of the package sleeve.

13. The package sleeve according to claim 1, wherein the composite material of the package sleeve has a weight in the range between 150 g/m² and 400 g/m².

14. The package sleeve according to claim 1, wherein the longitudinal seam connects together two partial areas of the rear surface.

15. The package sleeve according to claim 1, wherein the layer of paper or paperboard is covered by a sealing strip and/or by turning over the composite material in the region of the longitudinal seam.

16. The package sleeve according to claim 1, wherein the composite material is stripped in the region of the longitudinal seam.

17. The package sleeve according to claim 1, further comprising a material weakening in one of the gable surfaces, for fixing a pouring element.

18. A package made of a composite material,
wherein the package is folded along the fold lines,
wherein the package is sealed in the region of the base surface and in the region of the gable surface, and
wherein the partial areas of both side surfaces adjacent to the secondary fold lines are in each case arranged relative to one another in an angular range between 160° and 200°, in particular between 170° and 190°,
wherein the package is manufactured from a package sleeve according to claim 1.

19. The package according to claim 18, wherein the front surface and the rear surface are arranged in planes lying roughly parallel to one another.

20. The package sleeve according to claim 18, wherein the two side surfaces are arranged in planes lying roughly parallel to one another.

21. The package according to claim 18, further comprising lugs which are laid against the base surfaces in the lower region of the package.

22. The package according to claim 18, further comprising lugs which are laid against the side surfaces in the upper region of the package.

23. A method for manufacturing a package from a package sleeve made of a composite material, comprising:
 a) providing a package sleeve according to claim 1,
 b) the package sleeve along the fold lines between the side surfaces, the front surface and the rear surface,
 c) folding back the two side surfaces of the package sleeve along two secondary fold lines, and
 d) sealing the package sleeve in the region of the base surfaces,
wherein step d) is carried out both after step b) and also after step c).

24. The method according to claim 23, wherein the steps b) and c) are carried out simultaneously.

25. The method according to claim 23, wherein after being folded back, the partial areas of a side surface of the package adjoining the secondary fold lines in each case once again lie in an angular range between 160° and 200°.

* * * * *